May 12, 1942.  F. MARESCH  2,282,984
DAM DIGGER
Filed June 13, 1939
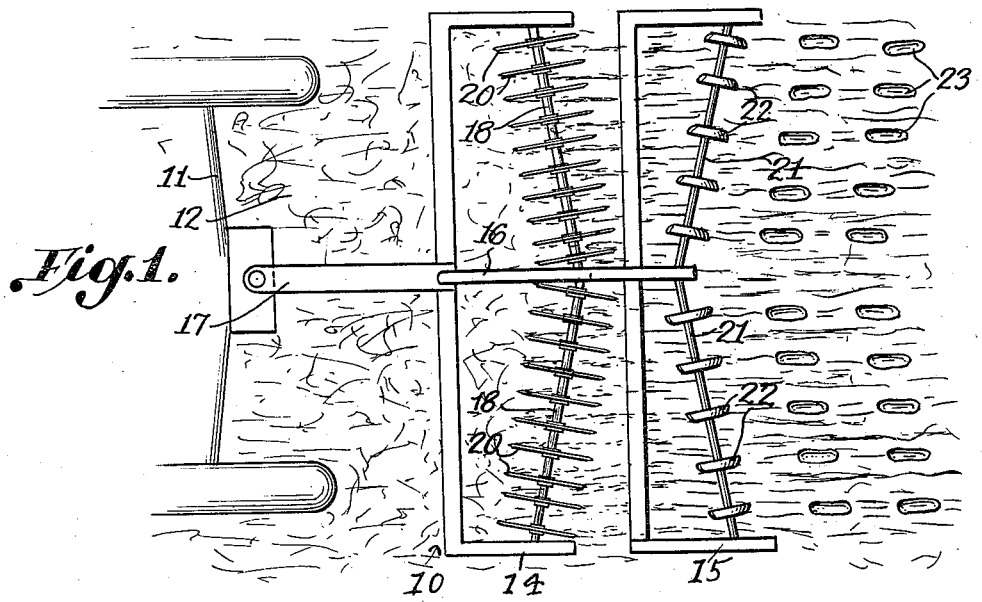
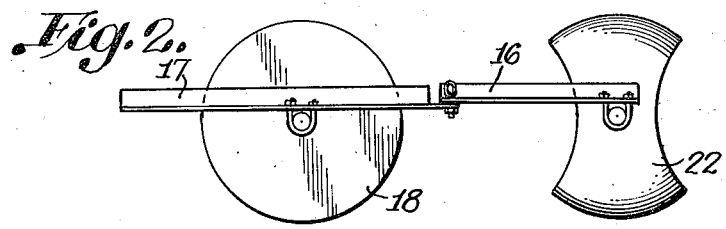
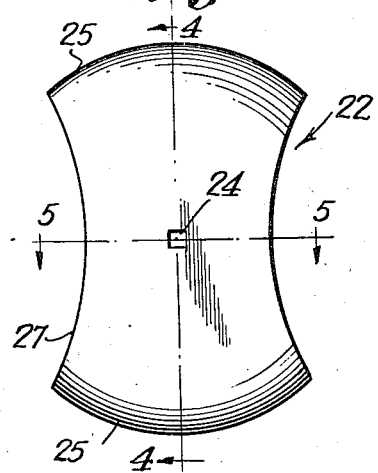
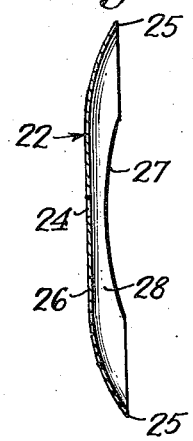
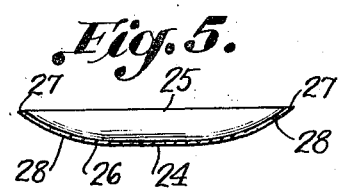
INVENTOR.
FRANK MARESCH.
BY Miller & Miller
ATTORNEYS.

Patented May 12, 1942

2,282,984

UNITED STATES PATENT OFFICE 2,282,984

DAM DIGGER

Frank Maresch, Nekoma, Kans.

Application June 13, 1939, Serial No. 278,960

4 Claims. (Cl. 97—220)

This invention relates to a dam digger and has for an object to provide an improvement in an agricultural implement particularly of the nature used in the preparation of a crop and for summer fallowing and to control wind and water erosion of the soil.

It is the object of this invention to provide a dam digger for the purpose of damming the ground so that water may be conserved and not run off.

A further object of this invention is to provide a dam digger which can be substituted in place of some of the discs of a tandem disc or one-way plow so that the tandem disc may be used for its original purpose of tearing up the ground, killing the weeds and volunteer wheat and simultaneously dig holes to hold the rainfall without running off.

A further object of this invention is to provide an improved individual dam digger which may be easily substituted for some of the discs of a tandem disc and may therefore be easily removed to restore the tandem disc to its original construction and purpose.

With the foregoing and other objects in view, this invention comprises the construction, combination, and arrangement of parts hereinafter disclosed, claimed and illustrated on the accompanying drawing in which, Fig. 1 is a top plan view of a tandem disc to which this invention has been applied.

Fig. 2 is a side elevational view of a slightly different form of tandem disc showing the disc wheel and dam digger in position.

Fig. 3 is an enlarged elevational view of the dam digger per se.

Fig. 4 is a sectional view on line 4—4 of Fig. 3, and

Fig. 5 is a sectional view on line 5—5 of Fig. 3.

There is shown at 10 a tandem disc hitched to the back of the tractor 11 for drawing the tandem disc 10 over the field 12 in the regular manner. The tandem disc 10 consists of a pair of frameworks 14 and 15 hooked to each other by the bar 16 and in turn attached to the tractor by the draw bar 17. The frame 14 is provided with the conventional shafts 18 forming a V angle and each shaft 18 is provided with the usual plowing discs 20 which turn up the surface of the ground, killing weeds et cetera in the usual manner.

The rear frame 15 is likewise provided with a pair of shafts 21, likewise forming a V angle, but with the apex forward instead of rearward as in the Fig. 1. These shafts 21 are usually provided with discs 20 but in this invention the discs have been removed and the dam diggers 22 forming the essence of this invention have been substituted therefor, it being observed from Fig. 1 that the dam diggers 22 are spaced twice as far apart on shaft 21 as the discs 20 whereby only half as many dam diggers on shaft 21 are provided as there are discs 20 on shaft 18.

These discs 22 are shaped generally as shown in Figs. 3, 4, and 5, the size varying according to the size of the holes 23 in the field 12 that are to be made by the dam diggers.

The dam digger 22 is provided with a centrally located squared hole 24 so that it may be mounted on the shaft 21. The dam digger 22 is provided with a pair of sharp digger edges 25, the edges 25 being dished away from the plane of the body 26 of the digger 22. In one preferred size, the plane of the digger edges will be 3" from the plane of the body 26 when the diameter of the digger is approximately 20", while a chord across the ends of the digger edges 25 is approximately 15". The dammer edges 27 extend between the ends of the digger edges 25, the dammer edges 27 being formed on the dished out flanges 28 extending from the body 26. The dam digger 22 may be formed of a thin sheet of metal having suitable physical properties by a stamping operation thereby enabling it to be produced cheaply and quickly.

In operation, the dam diggers 22 are placed on the shaft 21 in place of the discs 20 previously attached as shown in Fig. 1. The tractor 11 is operated to pull the tandem disc 10 in the customary manner. As it is drawn over the field 12 the discs 20 serve to tear up the ground and kill weeds et cetera in the customary manner, while the dam diggers following thereafter serve to scoop up and dam the holes 23 in the surface of the field 12.

When the dam digger 22 is of the preferred size above described, twenty holes 23 will be made for each revolution of the ten dam diggers 22, each hole 23 being big enough to hold one to four gallons of water each, the number of holes to a given area made depending upon the angle of the V formed by the shafts 21. The dam digger thus used serves to conserve the rainfall and prevents both water and wind erosion, leaving the land in a better condition for farming purposes.

The novel features and the operation of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

I claim:

1. A dam digger for use on a farm implement comprising a substantially circular dished blank, a sharpened and dished digger edge on said blank and a flanged concave damming edge on said blank extending into said digger edge.

2. A dam digger for use on a farming device comprising a substantially circular blank, a pair of oppositely disposed sharpened and dished digger edges, and a pair of concave flanged damming edges joining said circular digging edges.

3. A dam digger for use in place of some of the discs of a farming tool such as a tandem disc, said dam digger comprising a single blank, said blank having a pair of oppositely disposed circular edges and a pair of oppositely disposed concave edges between said circular edges, said blank being dished and said circular edges being in a plane spaced from the body of the blank, said concave edges being flanged from the body of the blank whereby said digger edges dig into the ground surface to scoop out earth and said dammer edges smooth over the scooped out earth thereafter above the ground surface to provide rain retaining pockets in the ground surface.

4. For use in place of some of the discs of a tandem disc farming tool, a plurality of dam diggers, each dam digger comprising a blank, means in the center of said blank for cooperating with the tandem disc, the edges of said blank being dished and flanged away from the body of said blank, a pair of sharpened digger edges on the dished out portions of said blank and a pair of oppositely disposed concave damming edges between said digging edges, said damming edges being in the flanged out portions of said blank.

FRANK MARESCH.